United States Patent
Prater

(10) Patent No.: US 6,618,226 B2
(45) Date of Patent: Sep. 9, 2003

(54) LOCALLY DEFORMABLE SLEEVE ON DISK DRIVE PIVOT ASSEMBLY

(75) Inventor: Walter Lloyd Prater, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/901,843

(22) Filed: Jul. 10, 2001

(65) Prior Publication Data

US 2003/0011938 A1 Jan. 16, 2003

(51) Int. Cl.⁷ .................................................. G11B 5/55
(52) U.S. Cl. .................................................... 360/265.7
(58) Field of Search ............................ 360/265.7, 265.2

(56) References Cited

U.S. PATENT DOCUMENTS

| | | | | |
|---|---|---|---|---|
| 4,772,151 A | * | 9/1988 | Lammers et al. ............ 403/162 |
| 4,893,206 A | * | 1/1990 | Shtipelman et al. ..... 360/265.2 |
| 5,161,077 A | * | 11/1992 | Jabbari .................... 360/265.6 |
| 5,251,085 A | | 10/1993 | Morris et al. |
| 5,260,847 A | * | 11/1993 | Basehore et al. ......... 360/265.7 |
| 5,301,078 A | | 4/1994 | Makino et al. |
| 5,315,465 A | | 5/1994 | Blanks |
| 5,473,489 A | | 12/1995 | Sanada |
| 5,666,242 A | * | 9/1997 | Edwards et al. ......... 360/265.6 |
| 5,675,456 A | | 10/1997 | Myers |
| 5,727,882 A | * | 3/1998 | Butler et al. ................ 384/611 |
| 5,818,665 A | | 10/1998 | Malagrino, Jr. et al. |
| 5,894,382 A | * | 4/1999 | Hyde ....................... 360/265.6 |
| 5,914,837 A | * | 6/1999 | Edwards et al. ......... 360/265.6 |
| 5,930,071 A | | 7/1999 | Back |
| 6,038,105 A | | 3/2000 | Wood et al. |
| 6,480,363 B1 | * | 11/2002 | Prater ....................... 360/265.7 |
| 6,525,910 B1 | * | 2/2003 | Macpherson et al. .... 360/265.6 |

FOREIGN PATENT DOCUMENTS

| | | | |
|---|---|---|---|
| JP | 60117457 | 6/1985 | |
| JP | 60136066 | 7/1985 | |
| JP | 64-050747 | * 2/1989 | .......... H02K/33/18 |
| JP | 4149868 | 5/1992 | |
| JP | 4360077 | 12/1992 | |
| JP | 8315520 | 11/1996 | |
| JP | 10097769 | 4/1998 | |
| JP | 10125018 | 5/1998 | |

* cited by examiner

Primary Examiner—William Korzuch
Assistant Examiner—Christopher R. Beacham
(74) Attorney, Agent, or Firm—Robert B. Martin; Bracewell & Patterson, L.L.P.

(57) ABSTRACT

A disk drive pivot assembly has a locally deformable internal sleeve that is equipped with two small deformable zones where the sleeve makes contact with the actuator comb bore. The zones can be in the shape of two rings with a rectangular or circular cross-sectional shape. The material may include zinc, magnesium, copper, or aluminum, or their alloys. These materials are relatively soft and have a relatively low stiffness compared to the comb bore. The thickness of the rings may range from approximately 0.25 to 1.0 mm, and they may be attached via shrink fit or adhesive bonding.

18 Claims, 1 Drawing Sheet

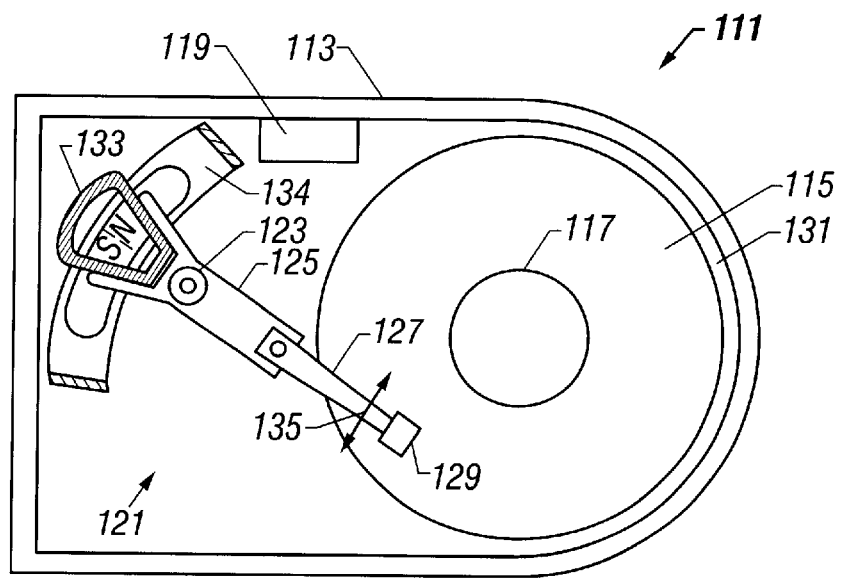
FIG. 1
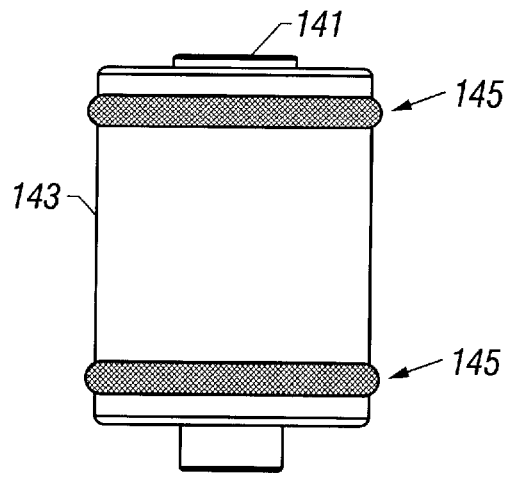
FIG. 2
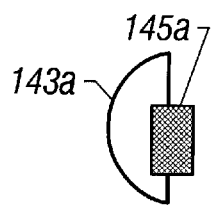  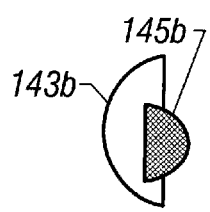  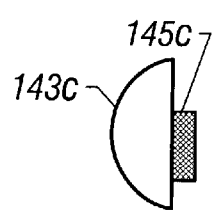
FIG. 3A         FIG. 3B         FIG. 3C

LOCALLY DEFORMABLE SLEEVE ON DISK DRIVE PIVOT ASSEMBLY

BACKGROUND OF THE INVENTION

1. Technical Field

The present invention relates in general to an improved disk drive pivot sleeve, and in particular to an improved disk drive pivot assembly with a locally deformable sleeve.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

Actuator assemblies typically utilize a comb-like structure that are formed from very stiff materials in order to increase servo bandwidth. These classes of materials, such as ceramics, metal matrix composites, and beryllium alloys, are up to five times stiffer and five times harder than aluminum. One common means to attach a pivot to a comb is to use a small screw to either push or pull the pivot into a scalloped portion of the comb bore. Due to slight geometrical imperfections (tolerances) of the pivot and comb bore, the parts do not make ideal and uniform contact. Fortunately, the elastic nature of aluminum comb bodies and pivot sleeves allow them to locally deform a small but sufficient amount at the points of contact, thereby effectively distributing the loads evenly among lines of contact.

Problems arise when a stiffer comb body does not locally deform against the pivot bearing sleeve, thus causing non-uniform loads at the lines of contact. The problem is exacerbated when the pivot sleeve is also made of the same high stiffness material in order to match the coefficient of thermal expansion of the comb and it can no longer locally deform against the comb bore. When this condition exists, the actuator is dynamically unstable because the comb and sleeve oscillate slightly with respect to each other under seek conditions. Seek energy causes the comb to rock on the pivot at the points with the highest loads. This instability will cause track misregistration at current and future track pitches. Thus, an improved disk drive pivot assembly is needed.

SUMMARY OF THE INVENTION

One embodiment of an improved disk drive pivot assembly has a locally deformable internal sleeve. The sleeve is equipped with two small deformable zones where the sleeve makes contact with the actuator comb bore. The zones can be in the shape of two rings with a rectangular or circular cross-sectional shape. The material may include zinc, magnesium, copper, or aluminum, or their alloys. These materials are relatively soft and have a relatively low stiffness compared to the comb bore. The thickness of the rings may range from approximately 0.25 to 1.0 mm, and they may be attached via shrink fit or adhesive bonding.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a plan view of a disk drive assembly with a cover removed to show the principle subassembly.

FIG. 2 is a side view of one embodiment of a pivot assembly constructed in accordance with the present invention.

FIG. 3a is an enlarged side view of the pivot assembly of FIG. 2 showing a deformable ring with a seated rectangular cross-section.

FIG. 3b is an enlarged side view of the pivot assembly of FIG. 2 showing a deformable ring with a seated semi-circular cross-section.

FIG. 3c is an enlarged side view of the pivot assembly of FIG. 2 showing a deformable ring with a surface-mounted rectangular cross-section.

DETAILED DESCRIPTION OF THE PREFERRED EMBODIMENT OF THE PRESENT INVENTION

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called head gimbal assembly is head 129 and the slider are mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Referring now to FIG. 2, a side view of pivot assembly 123 is shown. Pivot assembly 123 comprises a shaft 141 mounted within the bore of a sleeve 143. Sleeve 143 has a cylindrical exterior surface and is preferably formed from a very stiff material such as ceramics, ceramic composites, metal matrix composites, or beryllium alloys. Sleeve 143 has at least one deformable zone 145 (two shown). In the embodiment shown, zones 145 are axially spaced apart from each other, and each zone 145 circumscribes the exterior of sleeve 143. In the preferred embodiment, each zone 145 comprises a continuous ring that is mounted to sleeve 143.

As shown in FIGS. 3a–3c, the rings may have various cross-sectional shapes, including rectangular 145a (FIG. 3a) and 145c (FIG. 3c), and semi-circular shapes 145b (FIG. 3b). In addition, the rings may be seated within grooves or "rat bite" contact areas (FIGS. 3a and 3b) in the exterior of sleeve 143, or surface-mounted (FIG. 3c) to the exterior of sleeve 143 via shrink fit, adhesive bonding, etc. The rings of zones 145 are preferably formed from a relatively softer and low stiffness (Young's modulus) material than that of sleeve 143, such as zinc, magnesium, aluminum, copper, or their alloys. The thickness (in the radial direction) of each ring is in the range of 0.25 to 1.0 mm.

Transfer function analysis is a convenient way to measure the effect of the pivot-comb boundary condition on the actuator dynamics. The design of the present invention was tested with different materials and transfer functions were derived. In one application, the actuator had a pivot with a stainless steel sleeve, and in a second application the actuator had a pivot with an aluminum sleeve. The transfer functions were nearly identical with very clean butterfly resonance modes and only one peak at 72 dB. The second resonance (arm S-mode) was around 55 to 57 dB. In a soft aluminum comb bore, the pivot seats well regardless of the pivot sleeve material stiffness.

In addition, two transfer functions for the same head spindle assembly having an actuator comb formed from an alloy of 62% beryllium and 38% aluminum. This alloy is 2.8 times stiffer than an aluminum comb. In the first transfer function, the actuator had the same stainless steel pivot used with the aluminum comb, while in the second transfer function, the actuator had the same aluminum pivot used with the aluminum comb. There was a significant difference between the two transfer functions. With the stainless steel pivot, the first resonance (butterfly mode) broke into three peaks and is lower in amplitude. Moreover, the second resonance (arm S-mode) is lower in amplitude. The transfer functions were similar to those of a "mushy pivot" (i.e., an excessively compliant pivot due to low stiffness) actuator. When the stainless steel pivot was replaced with an aluminum pivot, the transfer function cleaned up.

This result is counterintuitive to what one skilled in the art would expect because a sleeve with a lower Young's modulus should contribute to pivot "mushiness." Surprisingly, the head spindle assembly transfer function with the aluminum pivot had a first resonance that had only one 5 dB higher amplitude peak, and a second resonance that was 5 dB higher in amplitude. This phenomenon was repeatable for three other stiff comb materials, namely, AlBC, AlSiC, and Al-65%Be. The phenomenon was repeatable for three stainless steel pivots and three aluminum pivots. These data confirm that a deformable metal, such as aluminum, seats better against a hard, stiff comb bore providing better and more consistent boundary conditions resulting in improved actuator dynamics.

The present invention has several advantages including thermal and dynamic compatibility with a relatively high stiffness actuator comb. The very stiff pivot sleeve has deformable zones or bands that are formed from a relatively softer and low stiffness material. The thickness of the bands is thick enough only to accommodate compliance and a snug fit between the sleeve and comb. Thus, the deformable metal bands deform between the stiffer sleeve and the stiffer bore to seat better against the bore to provide more consistent boundary conditions to improve the overall dynamics of the actuator.

While the invention has been shown or described in only some of its forms, it should be apparent to those skilled in the art that it is not so limited, but is susceptible to various changes without departing from the scope of the invention.

What is claimed is:

1. A pivot assembly for a disk drive actuator comb, comprising:

a sleeve having an internal bore;

a shaft mounted within the bore of the sleeve;

a deformable zone on the sleeve, the deformable zone being formed from a material that is relatively softer and has lower stiffness than a material of the sleeve; wherein the deformable zone is adapted to deform between the sleeve and a bore of the comb to provide more consistent boundary conditions that results in improved actuator dynamics; and wherein the deformable zone is formed from a material selected from the group consisting of zinc, magnesium, aluminum, copper, and their alloys.

2. The pivot assembly of claim 1 wherein the deformable zone circumscribes an external surface of the sleeve.

3. The pivot assembly of claim 1 wherein the deformable zone is a continuous ring.

4. The pivot assembly of claim 1 wherein the deformable zone has a rectangular cross-sectional shape.

5. The pivot assembly of claim 1 wherein the deformable zone has a semicircular cross-sectional shape.

6. The pivot assembly of claim 1 wherein the deformable zone is seated within a groove in the sleeve.

7. The pivot assembly of claim 1 wherein the deformable zone is surface-mounted to the sleeve.

8. The pivot assembly of claim 1 wherein the deformable zone has a thickness in the range of 0.25 to 1.0 mm.

9. The pivot assembly of claim 1 wherein the sleeve is formed from a material selected from the group consisting of ceramics, ceramic composites, metal matrix composites, and beryllium alloys.

10. A pivot assembly for a disk drive actuator comb, comprising:

a sleeve having a cylindrical external surface and an internal bore;

a shaft mounted within the bore of the sleeve;

at least two deformable, continuous rings mounted to and circumscribing the external surface of the sleeve, the deformable rings being axially spaced apart from each other and formed from a material that is relatively softer and has lower stiffness than a material of the sleeve; wherein the deformable rings are adapted to deform between the sleeve and a bore of the comb to provide more consistent boundary conditions that results in improved actuator dynamics; and wherein each of the rings is formed from a material selected from the group consisting of zinc, magnesium, aluminum, copper, and their alloys.

11. The pivot assembly of claim 10 wherein each of the rings has a rectangular cross-sectional shape.

12. The pivot assembly of claim 10 wherein each of the rings has a semi-circular cross-sectional shape.

13. The pivot assembly of claim 10 wherein each of the rings is seated within a groove in the sleeve.

14. The pivot assembly of claim 10 wherein each of the rings is surface-mounted to the sleeve.

15. The pivot assembly of claim 10 wherein each of the rings has a thickness in the range of 0.25 to 1.0 mm.

16. The pivot assembly of claim 10 wherein the sleeve is formed from a material selected from the group consisting of ceramics, ceramic composites, metal matrix composites, and beryllium alloys.

17. A disk drive actuator, comprising:

an actuator comb having an internal bore;

a sleeve mounted inside the comb bore and having a cylindrical external surface and an internal bore;

a shaft mounted within the sleeve bore;

at least two deformable, continuous rings mounted to and circumscribing the external surface of the sleeve, the deformable rings being axially spaced apart from each other and formed from a material that is relatively softer and has lower stiffness than a material of the sleeve; wherein the deformable rings deform between the sleeve and the comb bore when the sleeve is mounted within the comb bore to provide more consistent boundary conditions that results in improved actuator dynamics; and wherein each of the rings is formed from a material selected from the group consisting of zinc, magnesium, aluminum, copper, and their alloys.

18. The disk drive actuator of claim 17 wherein the sleeve is formed from a material selected from the group consisting of ceramics, ceramic composites, metal matrix composites, and beryllium alloys.

\* \* \* \* \*